United States Patent [19]
Green

[11] Patent Number: 6,044,478
[45] Date of Patent: Mar. 28, 2000

[54] CACHE WITH FINELY GRANULAR LOCKED-DOWN REGIONS

[75] Inventor: Daniel W. Green, Plano, Tex.

[73] Assignee: National Semiconductor Corporation, Santa Clara, Calif.

[21] Appl. No.: 08/865,909

[22] Filed: May 30, 1997

[51] Int. Cl.[7] ....................................................... G06F 12/12
[52] U.S. Cl. .............................. 714/42; 711/163; 711/141
[58] Field of Search ................................ 395/200.33, 375, 395/403, 425, 452; 714/5, 38, 42; 711/163, 141; 709/203

[56] References Cited

U.S. PATENT DOCUMENTS

| | | |
|---|---|---|
| 4,513,367 | 4/1985 | Chan et al. . |
| 5,230,070 | 7/1993 | Liu ........................................... 395/425 |
| 5,249,286 | 9/1993 | Alpert et al. . |
| 5,299,318 | 3/1994 | Bernard et al. .......................... 395/375 |
| 5,353,425 | 10/1994 | Malamy et al. . |
| 5,390,318 | 2/1995 | Kadangode et al. . |
| 5,487,162 | 1/1996 | Tetsuya et al. . |
| 5,493,667 | 2/1996 | Huck et al. . |
| 5,694,567 | 12/1997 | Bourekas et al. ........................ 395/403 |
| 5,805,809 | 9/1998 | Singh et al. ........................ 395/200.33 |

OTHER PUBLICATIONS

Intel Model Specific Registers and Functions, Chpt. 16, pp. 16–1 through 16–35 Computer Architecture A Quantitative Approach, David A. Patterson, pp. 408–425, Morgan Kaufmann Publishers, Inc. 1990.

*Primary Examiner*—Joseph E. Palys
*Assistant Examiner*—Omar A. Omar
*Attorney, Agent, or Firm*—John L. Maxin

[57] ABSTRACT

A cache has programmable, finely ganular, locked-down regions within a way or way(s) so that the contents of the locked-down regions are not evicted. The finely granular locked-down regions need not be contiguous and are programmed as either "locked-valid" or "locked-invalid" to provide general purpose memory that is local and private to the processor or for masking defected cache lines or portions thereof. Finely granular, programmable spatial regions of the cache that are locked-down are preferably, although not exclusively, programmed through two additional states to the standard MESI (Modified, Exclusive, Shared, Invalid) protocol for multipurpose cache coherency.

15 Claims, 6 Drawing Sheets

CACHE WITH FINELY GRANULAR LOCKED-DOWN REGIONS

CROSS-REFERENCE TO RELATED APPLICATION

This patent is related to and commonly assigned U.S. patent application Ser. No. 08/464,921 (Attorney's Docket No. CX-00233), entitled "Partionable Cache Having Spatially Defined Programmable Locked-Down Regions", filed Jun. 5, 1995 and herein incorporated by reference.

BACKGROUND OF THE INVENTION

1. Field of the Invention

The invention relates generally to computer systems, and more specifically to a system and method of caching that permits finely granular, programmable regions to be locked-down thus preventing eviction to provide, among other things, a fast memory scratchpad work area with general application while remaining cache regions provide standard caching functions.

2. Description of Related Art

A cache is a relatively small but fast buffer disposed near the processor for the purpose of reducing latency associated with processor accesses to relatively slow system memory. The cache "shadows" selective portions of the system memory containing temporally or spatially related information acted upon by the processor. Generally speaking, caches can be broadly categorized into two types, namely: a hardware managed array or a software managed array.

The hardware managed type can be generally characterized as an n-way set associative array (where n ranges from direct to fully associative) that replaces entries without any substantial interaction by the operating system or application program software, typically based on the least recently used ("LRU") or most recently used ("MRU") status of the entries. The software managed type typically employs a small random access memory (RAM) that is managed by the operating system or application program software for entry replacement—requiring specific knowledge of the behavior or flow of data or code stored in the cache. Most general purpose processors employ the first type while a large number of digital signal processors (DSPs) employ the second type.

The principal advantage of the first type over the second type is the independence of the cache line replacement policy from the program executed by the processor, particularly useful when executing large application programs or operating systems which tend to jump around to various blocks in address space. A drawback however, of the hardware managed array is that the cache line replacement technique, such as LRU, is not well attuned to certain real-time programming contexts in which, for example, a series of instructions are iteratively executed many times in a time-critical fashion.

The software managed array type of cache is appropriately used by most DSPs, since typically, execution of real-time programming requires program code to stay at or near the top of the memory hierarchy and hence resident in the fastest RAM. DSP-style caches don't suffer from the same "swap-out" problems of the first type cache, but are best applicable to constrained environments where the operating system is relatively simple and the software programs to be executed are known. This restriction arises since software has to explicitly manage the contents of the cache. Thus, the operating system and perhaps even the application program running on the DSP have to be customized for the particular system and software configuration.

An amalgam of both type of caches can be found, inter alia, in U.S. Pat. No. 5,493,667 to Huck et al. wherein an LRU replacement method and temporal lock-down technique are used to prohibit eviction or invalidation of cache entries in a portion of an instruction cache based on execution of a special "block" instruction. The temporal lock-down technique is intended to hold time critical instruction code (e.g. real-time repetitive/recursive routines) in the instruction cache irrespective of usage status such as LRU. More specifically, a special so-called "block" instruction is executed shortly after an initial execution of the time critical instruction code—freezing the replacement status (e.g. LRU) thus forcing subsequent cache replacements into cache entries other than those occupied by the time critical instruction routine. After the time critical routine is completed, a special so-called "unblock" instruction is executed to release the instruction cache for full general purpose utilization.

A drawback with this approach is the "coarseness" of the defined locked-down regions. For example, if the instruction cache is organized as two way set associative, executing the special block instruction would "block" (freeze) fifty percent of the instruction cache—leaving only the other fifty percent available for general instruction caching functions. Similarly, if the cache is organized as four way set associative, then executing the special block instruction would effectively convert the instruction cache to a three way set associative instruction cache, leaving only seventy five percent of the instruction cache available for general instruction cache purposes—regardless of the size of the time critical routine.

Another drawback with this lock down approach is that it is specific to locking most recent instruction cache entries and devoid of application to locking data in the instruction cache based on the address (as opposed to past temporal use) of that data.

It can be seen therefore, that there is a need for a cache with finely granular locked-down regions suitable for use with general operating system and application programs as well as to effectively accommodate repetitive (recursive) specialized programs.

SUMMARY OF THE INVENTION

To overcome the limitations of the prior art described above, and to overcome other limitations that will become apparent upon reading and understanding the present specification, the present invention discloses a set associative cache having programmable, finely granular locked-down regions within a way or way(s) so that the contents of the locked-down regions are not evicted. The finely granular locked-down regions of the cache need not be contiguous and are programmed as either "Locked-Valid" or "Locked-Invalid" to provide general purpose memory that is local and private to the processor or as a means for masking defective cache lines or portions thereof, respectively. Regions of the cache that are not locked-down provide standard, general purpose, set-associative caching functions. The partitioned cache allows critical data and real-time software programs to remain resident in the locked region while general operating system and application programs use the remainder with a more recently used line replacement technique that can support standard multiprocessor cache coherency protocols.

Finely granular, programmable spatial regions of the cache that are locked-down are preferably, although not exclusively, programmed with relevant data by executing general purpose load/store type instructions to designated registers within the system register set without the aid of any specialize instructions. A modified cache line replacement technique coined "more recently used" supports the lock-down protocol. In the preferred embodiment, programming the designated registers effectively adds two additional states to the standard MESI (Modified, Exclusive, Shared, Invalid) protocol for multiprocessor cache coherency namely: Locked-Valid and Locked-Invalid. If a location within the cache is identified as Locked-Valid, then a match of its tag will result in a hit and its contents will not be replaced. If a location within the cache is identified as Locked-Invalid, then a match of the tag will result in a miss but the contents will not be replaced. Alternative embodiments may specify the locked-down regions without specific reference to the MESI state or in terms of either physical or logical (virtual) addresses.

A feature of the present invention is that locked-down regions can be programmed in a finely granular fashion without regard to the associativity of the cache.

Another feature of the present invention is that line replacement continues after lock-down using a "more" recently used replacement technique that avoids regions that are locked-down.

Another feature of the present invention is that the unified cache provides programmable, finely granular, locked-down regions to support both instruction and data code.

Another feature of the present invention is that defective cache lines or portions thereof can be masked by the programmable, finely granular, locked-down regions thereby allowing less than perfect caches to be used without allocating substantial portions of the cache as unusable—thus increasing die yields.

Another feature of the present invention is the programmable, finely granular, locked-down regions can be used as a means for storing instruction code executed under the System Management Mode (SMM) of the processor.

Another feature of the present invention is the programmable, finely granular, locked-down regions can be used as a means for time critical-loop program storage such as, for example, a host-based modem or for video/audio compression and/or decompression.

Another feature of the present invention is the programmable, finely granular, locked-down regions can be used as a means for extending the register set of the processor.

Another feature of the present invention is the programmable, finely granular, locked-down regions can be used to store additional or patched code that would extend/repair the instruction set wherein the code may manifest itself as micro-code, RISC (pseudo) op-codes (ROPS), native machine op-codes, or data.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods employing a cache with finely granular locked-down regions, practiced in accordance with the present invention.

DESCRIPTION OF THE PREFERRED EMBODIMENT

The detailed description of the preferred embodiment for the present invention is organized as follows:
1. Exemplary Computing System
2. Exemplary Processor
3. Integer Unit
   3.1 Out-of-Order Processing
   3.2 Pipeline Selection
   3.3 Register Renaming
   3.4 Data Forwarding
      3.4.1 Operand Forwarding
      3.4.2 Result Forwarding
   3.5 Data Bypassing
   3.6 Branch Control
   3.7 Speculative Execution
   3.8 System Register Set
      3.8.1 Debug Registers
      3.8.2 Test Registers
      3.8.3 Model Specific Registers
4. Floating Point Unit
5. Cache Unit
6. L1 Cache
7. Replacement/Lock-Down Technique
8. Alternative Approach For Programming Locked-Down Regions
9. Superscalar Conflict Resolution
10. Exemplary Applications
   10.1 Masking Defective Cells In The Cache
   10.2 SMI Applications
   10.3 Critical-Loop Program Storage
   10.4 Critical Data Storage
   10.5 Micro-Architecture Extension
11. Conclusion This organizational table, and the corresponding headings used in this detailed description, are provided for the convenience of reference only and are not intended to limit the scope of the present invention. It is to be understood that while the preferred embodiment is described hereinbelow with respect to the x86 computer architecture, it has generally applicability to any architecture. Certain terminology related to the x86 computer architecture (such as register names, signal nomenclature, etc.) which are known to practitioners in the field of processor design, are not discussed in detail in order not to obscure the disclosure.

Moreover, structural details which will be readily apparent to those skilled in the art having the benefit of the description herein have been illustrated in the drawings by readily understandable block representations and state/flow diagrams, showing and describing details that are pertinent to the present invention. Thus, the illustrations in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

1. Exemplary Computing System

Figure 1:
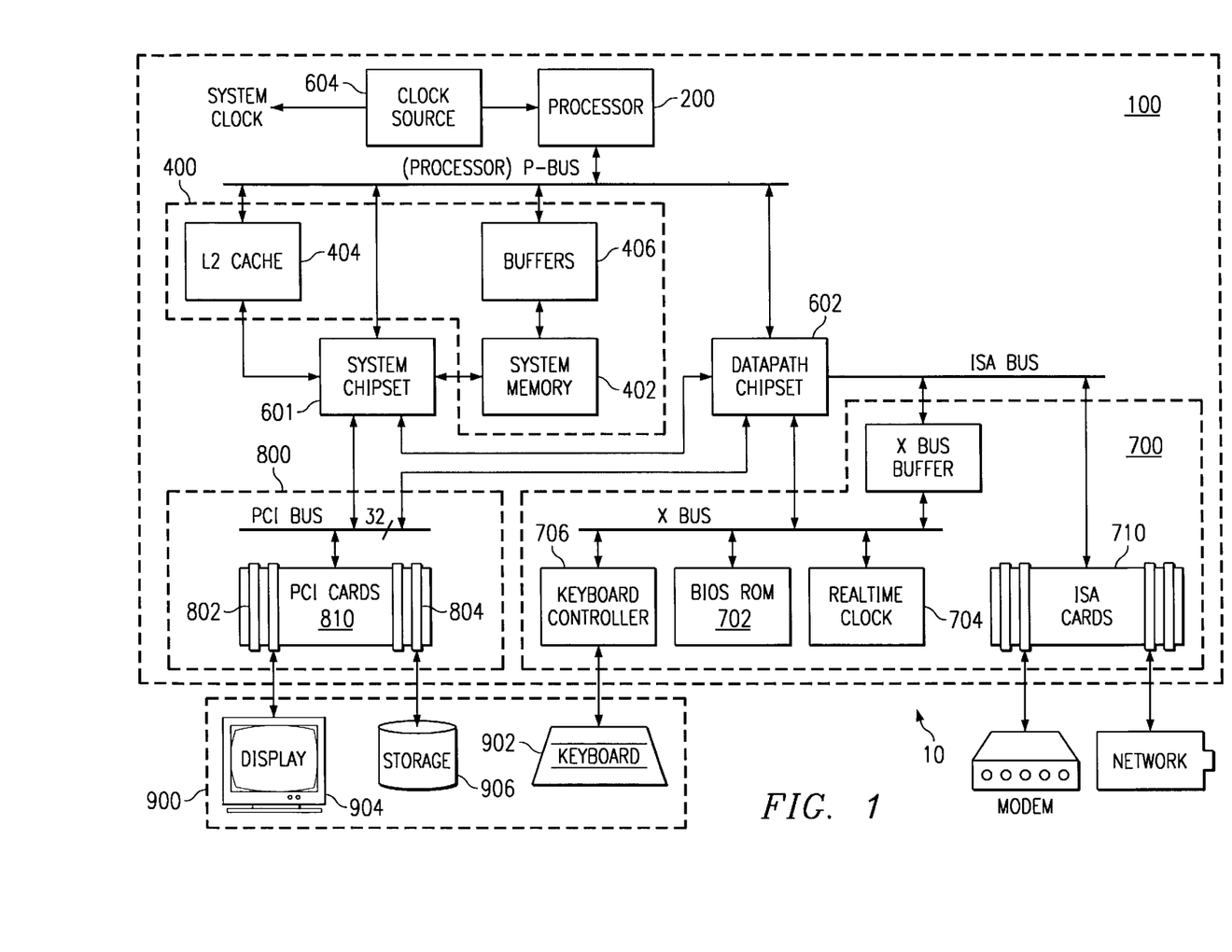
FIG. 1 is a block diagram of an exemplary processor system employing a cache practiced in accordance with the principles of the present invention.

FIG. 1 illustrates in block diagram form, an exemplary although not exclusive computer system including a system circuit board (a.k.a. motherboard) 100 and various peripherals and peripheral interfaces. Motherboard 100 includes a processor 200 and memory subsystem 400 inter-coupled over a processor P-Bus (sometimes referred to as a processor or local bus). System logic circuitry interfaces the processor 200 to three conventional peripheral buses namely: X-Bus, PCI-Bus, and ISA-Bus. System logic circuitry includes a system chipset 601 and a datapath chipset 602 (sometimes referred to as a North-Bridge and South-Bridge, respectively), as well as an external clock source 604 that provides an external clock input to the processor 200 and a system clock signal to the remainder of the motherboard 100. The external clock source 604 may take on many forms without departing from the scope of the present invention including a digital or analog phase-locked loop or delay line loop circuitry, the exact details not being necessary for the understanding of the present invention. For the exemplary computer system, the P-Bus is compliant with the so-called "Socket 7" protocol.

Processor 200 and the memory subsystem 400 reside on the P-Bus—the only other direct connections to the P-Bus are the system and datapath chipsets 601 and 602, respectively. According to the ex emplary division of system logic functions, the system chipset 601 interfaces to a conventional 32-bit PCI-Bus, while the datapath chipset 602 interfaces to the 16-bit ISA-Bus and the internal 8-bit X-Bus. Alternative embodiments allow for a special Advanced Graphics Port (AGP) to interface the P-Bus to a graphics accelerator.

Processor 200 is coupled over the P-Bus to a L2 (level 2) cache 404 and through data buffers 406 to system (DRAM) memory 402. The system chipset 601 includes control circuitry for the P-Bus, system memory 402, and the L2 cache 404. The datapath chipset 602 also interfaces to the conventional X-Bus. The X-Bus is an internal 8-bit bus that couples to the BIOS ROM 702 and the real-time clock (RTC) 704. In addition, the X-Bus connects to a conventional 8-bit keyboard controller 706.

The system and datapath chipsets 601 and 602 provide interface control for the 16-bit ISA-Bus and the 32-bit PCI-Bus. The ISA-Bus maintains compatibility with industry standard peripherals, coupling to ISA compliant peripheral card slots 710. The PCI-Bus provides a higher performance peripheral interface for selected peripherals, including coupling to PCI compliant peripheral card slots 810—in particular, a video/graphics card 802 provides a video/graphics interface, while a storage controller 804 (which may be included as part of the system chipset 601) interfaces to mass storage 906.

The motherboard 100 couples through the PCI, ISA, and X Buses to external peripherals 900, such as keyboard 902, display 904, and mass storage 906. Network and modem interconnections are provided as ISA cards, but it is to be understood that they could also be provided as PCI cards.

2. Exemplary Processor

Figure 2:
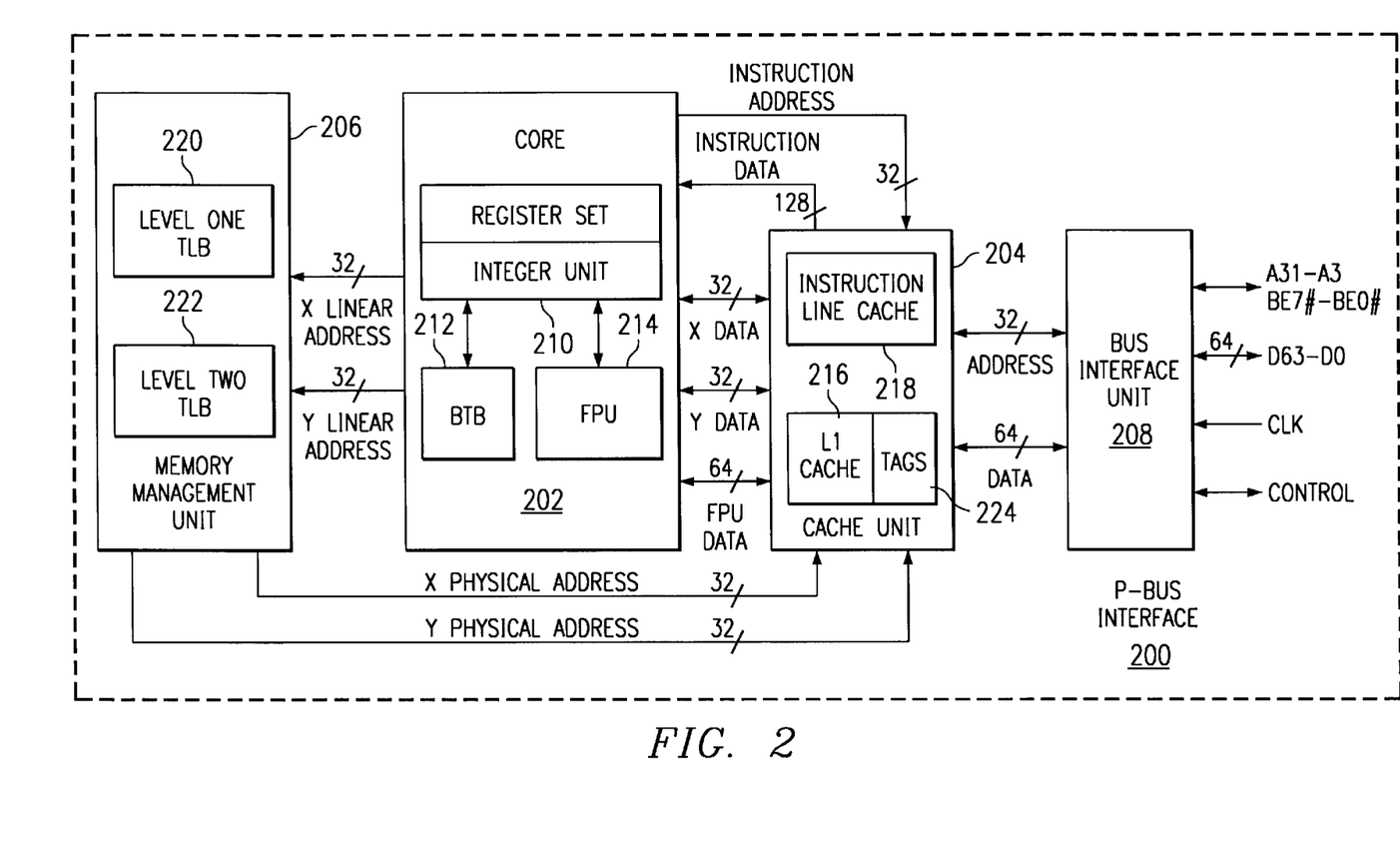
FIG. 2 is a block diagram of the processor depicted in FIG. 1.

Reference is now made to FIG. 2 which depicts a block diagram of the exemplary processor 200 employing a Cache Unit 204 in accordance with the principles of the present invention. It is be understood that other/additional functional partitioning for the processor 200 may be utilized and other modifications can be made, without departing from the scope and spirit of the present invention.

The processor 200 comprises four functional units, namely: i) Core 202; ii) Cache Unit 204; iii) Memory Management Unit (MMU) 206; and, iv) Bus Interface Unit (BIU) 208.

The Core 202 comprises a superpipelined integer unit (IU) 210, a Branch Target Buffer (BTB) 212 and a Floating Point Unit (FPU) 214 with provisions to support extensions for multimedia instructions.

The Cache Unit 204 comprises a unified 64K byte L1 cache 216 that stores most recently used data and instruction code and a 256 byte instruction line cache 218 that exclusively stores instruction code.

The MMU 206 translates linear addresses supplied by the IU 210 into a physical addresses for use by the L1 cache 216 and transmission through the BIU 208. Memory management procedures are preferably x86 compatible, adhering to standard paging mechanisms. The MMU 206 preferably comprises two translation lookaside buffers (TLBs) namely; a main level one (L1) TLB 220 and a larger level two (L2) TLB 222. The L1 TLB 220 is preferably direct mapped and has sixteen entries to hold forty-two lines. The L2 TLB 222 is preferably six-way set associative and has three hundred eighty four entries to hold three hundred eighty four lines. The Directory Table Entry (DTE) is stored in either the L1 cache 216, the L2 cache 404, or in system memory 404.

The Bus Interface Unit (BIU) 208 provides the P-Bus interface. During a memory cycle, a memory location is selected through address lines (A31–A3 and BE7#–BE0#) on the P-Bus. Data is passed from or to memory through the data lines (D63–D0) on the P-Bus.

The Core 202 receives instructions from the Cache Unit 204. Integer instructions are decoded by either the X or Y processing pipelines within the superpipelined IU 210. The instruction is passed to the FPU 214 for processing if the instruction is a floating point or multimedia extension instruction. Data is fetched from the L1 cache 216. If the data is not in the L1 cache 216, it is accessed via the BIU 208 from either the L2 cache 404 or system memory 402 (FIG. 1).

3. The Integer Unit

Figure 3:
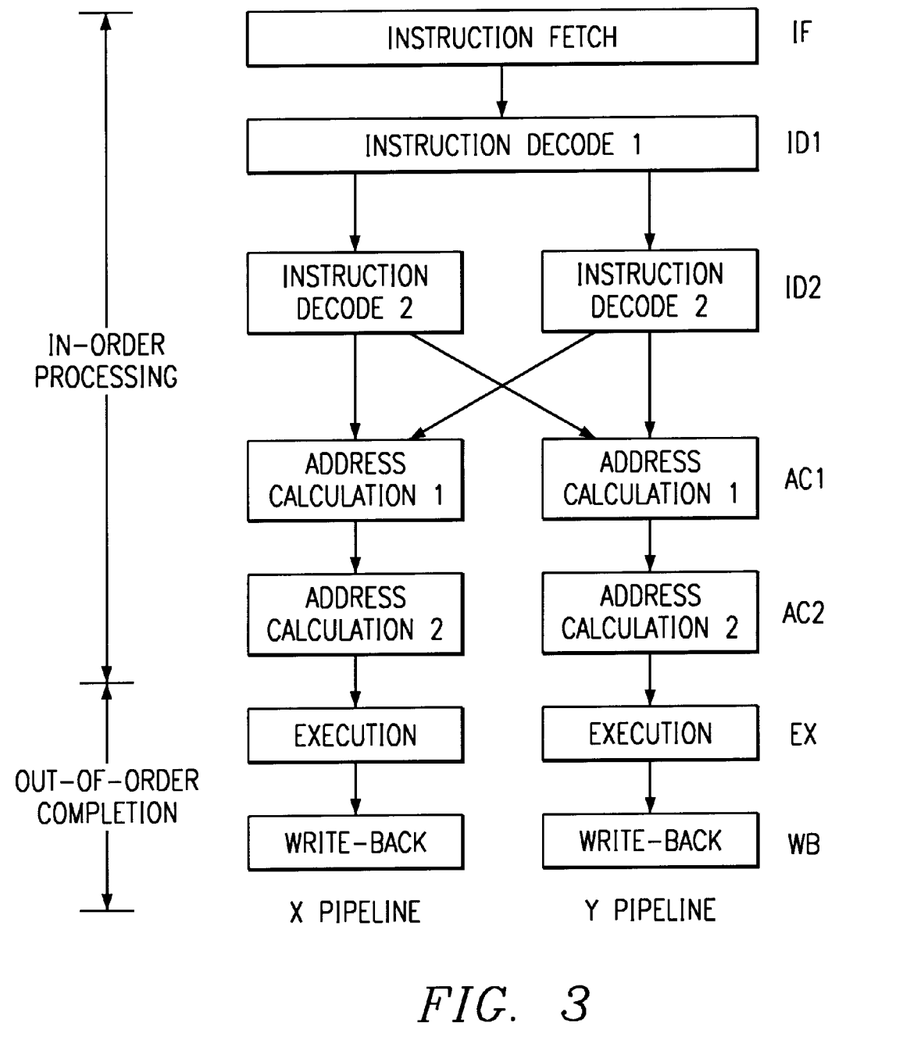
FIG. 3 is a block diagram of the pipelined stages of the superscalar Integer Unit depicted in FIG. 2.

Reference is now made to FIG. 3 which depicts a block diagram of the superpipelined stages of the IU 210. Parallel instruction execution is provided with two seven-stage integer pipelines. Each of the two pipelines, X and Y, can process several instructions simultaneously. Each pipeline comprises Instruction Fetch (IF), Instruction Decode 1 (ID1), Instruction Decode 2 (ID2), Address Calculation 1 (AC1), Address Calculation 2 (AC2), Execute (EX), and Write-Back (WB) stages.

The IF stage, shared by both the X and Y pipelines, fetches sixteen bytes of instruction code from the Cache Unit 204 in a single clock cycle. Within the IF stage, the code stream is checked for any branch instructions that could affect normal program sequencing. If an unconditional or conditional branch is detected, branch prediction logic within the IF stage generates a predicted target address for the instruction. The IF stage then fetches instructions at the predicted address.

The superpipelined Instruction Decode stage comprise sub-stages ID1 and ID2. ID1, shared by both X and Y pipelines, evaluates the code stream provided by the IF stage and determines the number of bytes in each instruction. Preferably at least two instructions per clock are delivered to the ID2 stages, one in each pipeline.

The ID2 stage decodes instructions and sends the decoded instructions to either the X or Y pipeline for execution. The particular pipeline is chosen, based on which instructions are already in each pipeline and how fast they are expected to flow through the remaining pipe-line stages.

The Address Calculation stage comprise sub-stages AC1 and AC2. If the instruction refers to a memory operand, AC1 calculates a linear memory address for the instruction. The AC2 stage performs any required memory management functions, cache accesses, and register file accesses. If a floating point instruction is detected by AC2, the instruction is sent to the FPU 214 for processing. The EX stage executes instructions using the operands provided by the address calculation stage. The WB stage stores execution results either to a register file within the IU 210 or to a write buffer in the Cache Unit 204.

3.1 Out-of-Order Processing

If an instruction executes faster than the previous instruction in the other pipeline, the instructions may complete out of order. All instructions are processed in order, up to the EX stage. While in the EX and WB stages, instructions may be completed out of order. If there is a data dependency between instructions, hardware interlocks are enforced to ensure correct program execution. Even though instructions may complete out of order, exceptions and writes resulting from the instructions are always issued in program order.

3.2 Pipeline Selection

In most cases, instructions are processed in either X or Y pipeline without pairing constraints on the instructions. However, certain instructions are preferably processed only in the X pipeline namely: branch, floating point, and exclusive instructions. Branch and floating point instructions may be paired with a second instruction in the Y pipeline. Exclusive instructions (e.g. protected mode segment loads, special control, debug and test register accesses, string instructions, multiply and divide, I/O port accesses, push all and pop all, and inter-segment jumps, calls, and returns), that typically require multiple memory accesses, are not preferably paired with instructions in the Y pipeline. Although exclusive instructions are not paired, hardware from both pipelines is used to accelerate instruction completion.

When two instructions that are executing in parallel require access to the same data or register, one of the following types of data dependencies may occur: Read-After-Write (RAW), Write-After-Read (WAR), and Write-After-Write (WAW). Data dependencies typically force serialized execution of instructions. However, the processor 200 employs register renaming, data forwarding, and data bypassing mechanisms that allow parallel execution of instructions containing data dependencies.

3.3 Register Renaming

The processor 200 includes a register file containing 32 physical general purpose registers each of which can be temporarily assigned as one of the general purpose registers defined by the x86 architecture (EAX, EBX, ECX, EDX, ESI, EDI, EBP, and ESP). For each register write operation, a new physical register is selected to allow previous data to be retained temporarily—effectively removing WAW and WAR dependencies. The programmer does not have to consider register renaming as register renaming is completely transparent to both the operating system and application software.

A WAR dependency exists when the first in a pair of instructions reads a logical register, and the second instruction writes to the same logical register. This type of dependency is illustrated by the pair of instructions shown below:

| X PIPE | Y PIPE |
|---|---|
| (1) MOV BX,AX | (2) ADD AX,CX |
| BX←AX | AX←AX+CX |

In this and the following examples the original instruction order is shown in parentheses.

In the absence of register renaming, the ADD instruction in the Y pipe would have to be stalled to allow the MOV instruction in the X pipe to read the AX register. The IU 210 however, avoids the Y pipe stall as can be seen with reference to Table 1 below. As each instruction executes, the results are placed in new physical registers to avoid the possibility of overwriting a logical register value and to allow the two instructions to complete in parallel (or out of order) rather than in sequence.

TABLE 1

Register Renaming with WAR Dependency

| | Physical Register Contents | | | | | | |
|---|---|---|---|---|---|---|---|
| Instruction | Reg0 | Reg1 | Reg2 | Reg3 | Reg4 | Pipe | Action |
| (Initial) | AX | BX | CX | | | | |
| MOV BX,AX | AX | | CX | BX | | X | Reg3←Reg0 |
| ADD AX,CX | | | CX | BX | AX | Y | Reg4←Reg0+Reg2 |

The representation of the MOV and ADD instructions in the final column of Table 1 are completely independent.

A WAW dependency occurs when two consecutive instructions perform writes to the same logical register. This type of dependency is illustrated by the pair of instructions shown below:

| X PIPE | Y PIPE |
|---|---|
| (1) ADD AX,BX | (2) MOV AX,[mem] |
| AX←AX+BX | AX←[mem] |

Without register renaming, the MOV instruction in the Y pipe would have to be stalled to guarantee that the ADD instruction in the X pipe would first write its results to the AX register. The IU 210 however, avoids the Y pipe stall as can be seen with reference to Table 2 below The contents of the AX and BX registers are placed in physical registers. As each instruction executes, the results are placed in new physical registers to avoid the possibility of overwriting a logical register value and to allow the two instructions to complete in parallel (or out of order) rather than in sequence.

All subsequent reads of the logical register AX will refer to Reg3, the result of the MOV instruction.

TABLE 2

Register Renaming with WAW Dependency

| Instruction | Physical Register Contents | | | | Pipe | Action |
| --- | --- | --- | --- | --- | --- | --- |
|  | Reg0 | Reg1 | Reg2 | Reg3 | | |
| (Initial) | AX | BX | | | | |
| ADD AX,BX |  | BX | AX |  | X | Reg2←Reg0+Reg1 |
| MOV AX, [mem] |  | BX |  | AX | Y | Reg3←[mem] |

3.4 Data Forwarding

The IU 210 uses two types of data forwarding in conjunction with register renaming to eliminate RAW dependencies namely, operand forwarding and result forwarding.

Operand forwarding takes place when the first in a pair of instructions performs a move from register or memory, and the data that is read by the first instruction is required by the second instruction. The processor performs the read operation and makes the data read available to both instructions simultaneously.

Result forwarding takes place when the first in a pair of instructions performs an operation (such as an ADD) and the result is required by the second instruction to perform a move to a register or memory. The processor 200 performs the required operation and stores the results of the operation to the destination of both instructions simultaneously.

3.4.1 Operand Forwarding

A RAW dependency occurs when the first in a pair of instructions performs a write, and the second instruction reads the same register. This type of dependency is illustrated by the pair of instructions shown below in the X and Y pipelines:

| X PIPE | Y PIPE |
| --- | --- |
| (1) MOV AX,[mem] | (2) ADD BX,AX |
| AX←[mem] | BX←AX+BX |

The IU 210 however, avoids the Y pipe stall as can be seen with reference to Table 3 below. Operand forwarding allows simultaneous execution of both instructions by first reading memory and then making the results available to both pipelines in parallel. Operand forwarding can only occur if the first instruction does not modify its source data. In other words, the instruction is a move type instruction (e.g. MOV, POP, LEA). Operand forwarding occurs for both register and memory operands. The size of the first instruction destination and the second instruction source must match.

TABLE 3

Operand Forwarding

| Instruction | Physical Register Contents | | | | Pipe | Action |
| --- | --- | --- | --- | --- | --- | --- |
|  | Reg0 | Reg1 | Reg2 | Reg3 | | |
| (Initial) | AX | BX | | | | |
| MOV AX,[mem] |  | BX | AX |  | X | Reg2←Reg2+[mem] |
| MOV AX,[mem] |  |  | AX | BX | Y | Reg3←[mem]+Reg1 |

3.4.2 Result Forwarding

A RAW dependency can occur when the first in a pair of instructions performs a write, and the second instruction reads the same register. This dependency is illustrated by the pair of instructions in the X and Y pipelines, as shown below:

| X PIPE | Y PIPE |
| --- | --- |
| (1) ADD AX,BX | (2) MOV [mem],AX |
| AX←AX+BX | [mem]←AX |

The IU 210 uses result forwarding and avoids the Y pipe stall as can be seen with reference to Table 4 below. Instead of transferring the contents of the AX register to memory, the result of the previous ADD instruction (Reg0+Reg1) is written directly to memory, thereby saving a clock cycle. The second instruction must be a move instruction and the destination of the second instruction may be either a register or memory.

TABLE 4

Result Forwarding

| Instruction | Physical Register Contents | | | Pipe | Action |
| --- | --- | --- | --- | --- | --- |
|  | Reg0 | Reg1 | Reg2 | | |
| (Initial) | AX | BX |  | | |
| ADD AX,BX |  | BX | AX | X | Reg2←Reg0+Reg1 |
| MOV [mem],AX |  | BX | AX | Y | [mem]←Reg0+Reg1 |

3.5 Data Bypassing

In addition to register renaming and data forwarding, the IU 210 provides a third data dependency-resolution technique called data bypassing. Data bypassing reduces the performance penalty of those memory data RAW dependencies that cannot be eliminated by data forwarding. Data bypassing is provided when the first in a pair of instructions writes to memory and the second instruction reads the same data from memory. The processor retains the data from the first instruction and passes it to the second instruction, thereby eliminating a memory read cycle. Data bypassing only occurs for cacheable memory locations.

A RAW dependency occurs when the first in a pair of instructions performs a write to memory and the second instruction reads the same memory location. This dependency is illustrated by the pair of instructions in the X and Y pipelines as shown below:

| X PIPE | Y PIPE |
|---|---|
| (1) ADD [mem],AX | (2) SUB BX, [mem] |
| [mem]←[mem]+AX | BX←BX-[mem] |

The IU 210 uses data bypassing and stalls the Y pipe for only one clock by eliminating the memory read cycle of the Y pipe as can be seen with reference to Table 5 below. Instead of reading memory in the Y pipe, the result of the previous instruction ([mem]+Reg0) is used to subtract from Reg1, thereby saving a memory access cycle.

TABLE 5

Data Bypassing

| | Physical Register Contents | | | | |
|---|---|---|---|---|---|
| Instruction | Reg0 | Reg1 | Reg2 | Pipe | Action |
| (Initial) | AX | BX | | | |
| ADD [mem],AX | AX | BX | | X | [mem]←[mem]+Reg0 |
| SUB BX,[mem] | AX | | BX | Y | Reg2←Reg1-{[mem]+Reg0} |

3.6 Branch Control

Through simulation and experimentation, the Assignee of the present invention has found that x86 branch instructions occur on average every four to six instructions. The processor 200 minimizes performance degradation and latency of branch instructions through the use of branch prediction and speculative execution. The processor 200 uses a 512-entry, 4-way set associative Branch Target Buffer (BTB) 212 to store branch target addresses and a 1024-entry branch history table. During the IF stage, the instruction stream is checked for the presence of branch instructions. If an unconditional branch instruction is encountered, the processor 200 accesses the BTB 212 to check for the target address of the branch instruction. If the target address is found in the BTB 212, the processor 200 begins fetching at the target address specified by the BTB 212.

In the case of conditional branches, the BTB 212 also provides history information to indicate whether the branch is more likely to be taken or not taken. If the conditional branch instruction is found in the BTB 212, the processor 200 begins fetching instructions at the predicted target address. If the conditional branch misses in the BTB 212, the processor 200 predicts that the branch will not be taken, and instruction fetching continues with the next sequential instruction. The decision to fetch the taken or not taken target address is preferably, although not necessarily, based on a four-state branch prediction algorithm such as those known within the skill of the art.

Once fetched, a conditional branch instruction is decoded and dispatched to the X pipeline only. The conditional branch instruction proceeds through the X pipeline and is resolved in either the EX stage or the WB stage. The conditional branch is resolved in the EX stage if the instruction responsible for setting the condition codes is completed prior to the execution of the branch. If the instruction that sets the condition codes is executed in parallel with the branch, the conditional branch instruction is resolved in the WB stage.

Correctly predicted branch instructions execute in a single core clock. If resolution of a branch indicates that a mis-prediction has occurred, the processor 200 flushes the pipe-line and starts fetching from the correct target address. The processor 200 preferably pre-fetches both the predicted and the non-predicted path for each conditional branch, thereby eliminating the cache access cycle on a mis-prediction. If the branch is resolved in the EX stage, the resulting mis-prediction latency is four cycles. If the branch is resolved in the WB stage, the latency is five cycles.

Since the target address of return (RET) instructions is dynamic rather than static, the processor 200 caches target addresses for RET instructions in an eight-entry return stack rather than in the BTB 212. The return address is pushed on the return stack during a CALL instruction and popped during the corresponding RET instruction.

3.7 Speculative Execution

The processor 200 is capable of speculative execution following a floating point instruction or predicted branch. Speculative execution allows the pipelines to continuously execute instructions following a branch without stalling the pipelines waiting for branch resolution. As will be described hereinbelow, the same mechanism is used to execute floating point instructions in parallel with integer instructions. The processor 200 provides at least four levels of speculation (i.e., combinations of four conditional branches and floating point operations). After generating the fetch address using branch prediction, the processor 200 checkpoints the machine state (registers, flags, and processor environment), increments the speculation level counter, and begins operating on the predicted instruction stream.

Once the branch instruction is resolved, the processor 200 decreases the speculation level. For a correctly predicted branch, the status of the checkpointed resources is cleared. For a branch mis-prediction, the processor 200 generates the correct fetch address and uses the checkpointed values to restore the machine state in a single clock. Writes that result from speculatively executed instructions are not permitted to update the cache or external memory until the appropriate branch is resolved. Speculative execution continues until one of the following conditions occurs: i) a branch or floating point operation is decoded and the speculation level is already at four; ii) an exception or a fault occurs; iii) the write buffers are full; or iv) an attempt is made to modify a non-checkpointed resource (e.g. segment registers and system flags).

3.8 System Register Set

Registers are broadly grouped into the application register set used by application programs and the system register set for use by the operating system program. The application register set preferably includes general purpose registers, segment registers, a flag register, and an instruction pointer register. The system register set includes control registers, system address registers, debug registers, configuration registers, and test registers. In order not to obscure the invention with unessential details, only relevant registers will be described with the understanding that those skilled in the art may easily refer for additional description to publications such as, but not limited to, the Cyrix 6x86*Microprocessor Data Book*, order number: 94175-01, dated March 1996, herein incorporated by reference.

Figure 4:
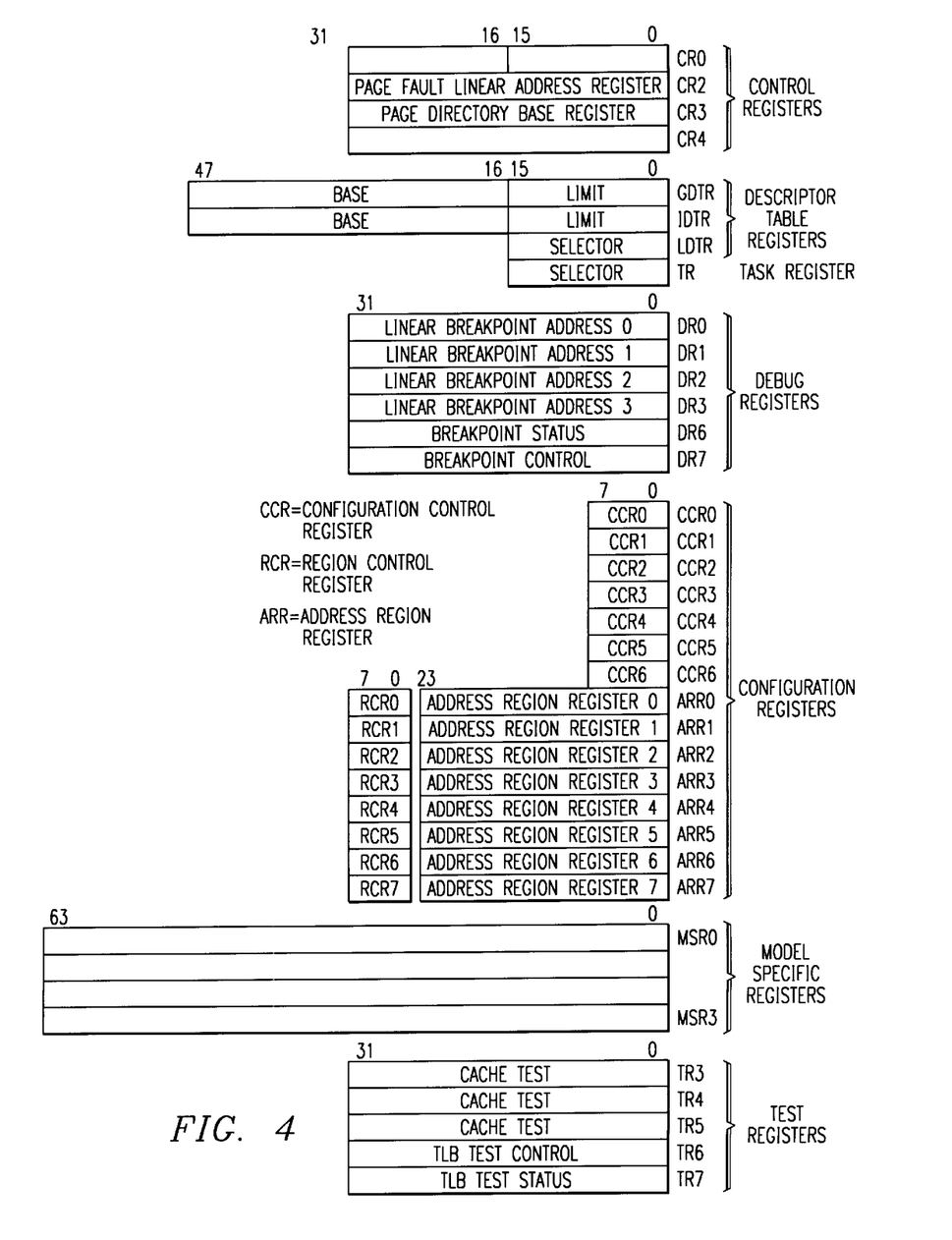
FIG. 4 is a block diagram of the preferred system register set of the processor depicted in FIG. 2.

Reference is now made to FIG. 4 which depicts the preferred system register set comprising registers not generally visible to application programmers and typically employed by operating systems and memory management programs. The control registers control certain aspects of the processor 200 such as paging, coprocessor functions, and segment protection. The configuration registers are used, inter alia, to configure the L1 cache 216, power management features and System Management Mode as well as provide information on device type and revision. The debug registers provide debugging facilities to enable the use of data access break-points and code execution breakpoints. The test registers provide a mean for programming and testing the contents of both the Cache Unit 204 and the MMU 206.

The Address Region Registers (ARR0–ARR7) are used to specify the location and size for the eight address regions. Attributes for each address region are specified in the Region Control Registers (RCR0–RCR7). ARR7 and RCR7 are used to define system main memory 402 and differ from ARR0–6 and RCR0–6. The processor 200 eliminates data dependencies and resource conflicts in its execution pipelines by defining non-cacheable regions on-chip. Accesses to address regions defined as non-cacheable by the Region Control Registers are not cached even if the external cache enable pin (KEN#) is active. A register index is used to select one of three bytes in each Address Region Registers. The starting address of the address region, selected by the START ADDRESS field, must be on a block size boundary. For example, a 128K byte block is allowed to have a starting address of 0K bytes, 128K bytes, 256K bytes, and so on.

The Region Control Registers (RCR0–RCR7) specify the attributes associated with the ARRx address regions. Cacheability, weak locking, write gathering, and cache write through policies can be activated or deactivated using the attribute bits defined in the region control registers.

3.8.1 Debug Registers

At least six debug registers (DR0–DR3, DR6 and DR7) support debugging on the processor 200. Memory addresses loaded in the debug registers, referred to as "breakpoints", generate a debug exception when a memory access of the specified type occurs to the specified address. A data breakpoint can be specified for a particular kind of memory access such as a read or a write. Code breakpoints can also be set allowing debug exceptions to occur whenever a given code access (execution) occurs. The size of the debug target can be preferably set to 1, 2, or 4 bytes. The debug registers are accessed via MOV instructions which can be executed only at privilege level 0. The Debug Address Registers (DR0–DR3) each contain the linear address for one of four possible breakpoints. Each breakpoint is further specified by bits in the Debug Control Register (DR7). For each breakpoint address in DR0–DR3, there are corresponding fields L, R/W, and LEN in DR7 that specify the type of memory access associated with the breakpoint. The R/W field can be used to specify instruction execution as well as data access break-points. Instruction execution breakpoints are preferably taken before execution of the instruction that matches the breakpoint.

The Debug Status Register (DR6) reflects conditions that were in effect at the time the debug exception occurred. The contents of the DR6 register are not automatically cleared by the processor after a debug exception occurs and, therefore, should be cleared by software at the appropriate time. Code execution breakpoints may also be generated by placing the breakpoint instruction (INT 3) at the location where control is to be regained. Additionally, the single-step feature may be enabled by setting the TF flag in the EFLAGS register to cause the processor 200 to perform a debug exception after the execution of every instruction.

3.8.2 Test Registers

As described in more detail hereinbelow, test registers TR3, TR4, and TR5 are used to program/test the L1 cache 216 and test registers TR6 and TR7 are used to program/test the Level One TLB 220. It is to be understood that the term "test registers" is used merely to generally denote registers within the system register set that are assigned to program/test various subsystems in the processor 200. With the aid of the present disclosure, those skilled in the art will bring to mind other registers in the system register set to program/test various subsystems without departing from the scope of the present invention.

3.8.3 Model Specific Registers

The processor 200 preferably includes at least four model specific registers (MSRs). MSRs control a variety of hardware and software-related features that are implementation (model) specific such as testability of the cache and/or the BTB or measurement of processor performance. A description of MSRs and the application to the x86 architecture can be found in the *Pentium® Processor Family Developer's Manual*, Order Number 241428-005, (Chapter 16), from Intel Corporation herein incorporated by reference. Generally speaking however, the contents of a particular MSR register specified by the ECX register are preferably read with a so-called "RDMSR" instruction by loading it into the EDX:EAX registers. The contents of a particular MSR register specified by the ECX register are preferably written with a so-called "WRMSR" instruction by loading it into the EDX:EAX registers. Those skilled in the art will bring to mind other forms and implementations of the MSRs without departing from the scope of the present invention.

4. Floating Point Unit

The FPU 214 processes floating point and multimedia extension instructions and is preferably x87 instruction set compatible adhering to the IEEE-754 standard. Floating point instructions may execute in parallel with integer instructions. Integer instructions may complete out of order with respect to the FPU 214 instructions. The processor 200 maintains x86 compatibility by signaling exceptions and issuing write cycles in program order. Floating point instructions are preferably dispatched to the X pipeline in the IU 210. The address calculation stage of the X pipeline checks for memory management exceptions and accesses memory operands used by the FPU 214. If no exceptions are detected, the state of the processor 200 is check-pointed and, during AC2, floating point instructions are dispatched to a FPU 214 instruction queue. The processor 200 can then complete subsequent integer instructions speculatively and out of order relative to the floating point instruction and relative to any potential floating point exceptions which may occur.

The processor 200 can preferably dispatch four or more floating point instructions to the floating point instruction queue. The processor 200 continues executing speculatively and out of order, relative to the FPU queue, until one of the conditions that causes speculative execution to halt is encountered. As the FPU 214 completes instructions, the speculation level decreases and the check-pointed resources are available for reuse in subsequent operations. The FPU 214 preferably has a set of six or more write buffers to prevent stalls due to speculative writes.

5. Cache Unit

Figure 5:
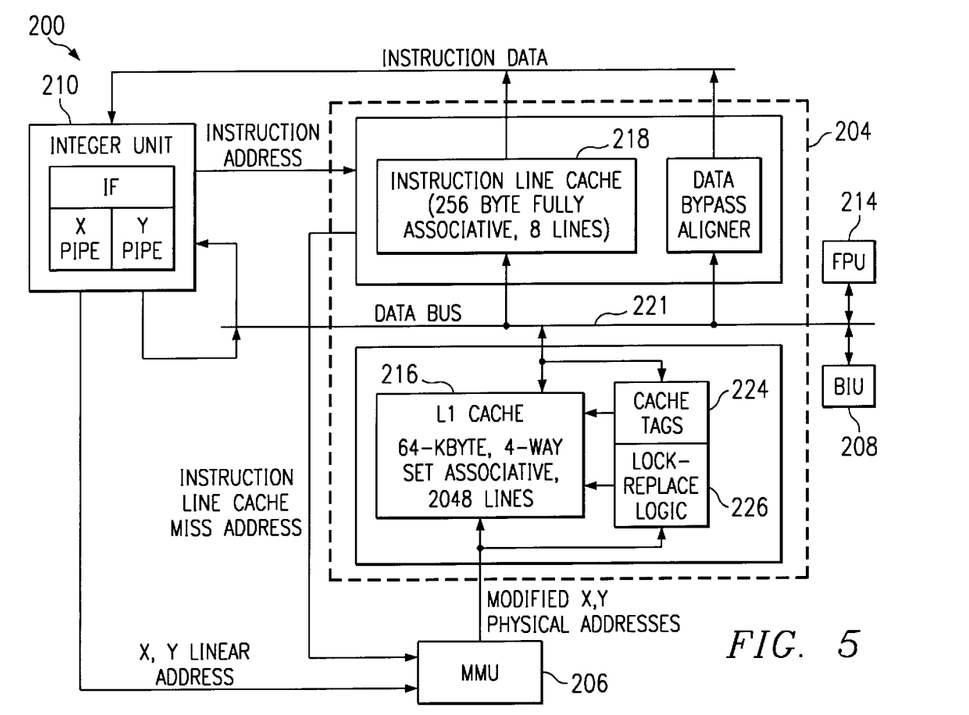
FIG. 5 is a block diagram of the processor depicted in FIG. 2 with emphasis on the Cache Unit.

Reference is now made to FIG. 5 which depicts a block diagram of the processor 200 with emphasis on the exemplary, but not exclusive, Cache Unit 204. The Cache Unit 204 preferably comprises an L1 cache 216 and an instruction line cache 218.

The L1 cache 216 is the primary data cache, secondary instruction cache, and is preferably although not exclusively, 64K bytes in size, organized as four-way set-associative, 512 lines per way, with 32 bytes per line (2048 lines) and each line broken into two 16 byte sectors.

The instruction line cache 218 is the primary instruction cache providing a high speed instruction stream to the IU 210 and is preferably although not exclusively, 256 bytes in size and fully associative. The instruction line cache 218 is filled from the L1 cache 216 over internal bus 221. Fetches from the IU 210 that hit in the instruction line cache 218 do not access the L1 cache 216. If an instruction line cache 218 miss occurs, the instruction line data from the L1 cache 216 is transferred simultaneously to the instruction line cache 218 and the IU 210. The instruction line cache 218 preferably uses a pseudo-LRU replacement algorithm and to ensure proper operation in the case of self-modifying code, any writes to the L1 cache 216 are checked against the contents of the instruction line cache 218. If a hit occurs in the instruction line cache 218, the appropriate line is invalidated.

It is to be understood that those skilled in the art will be able to bring to mind other organizations, sizes, associativities, and line replacement techniques for the Cache Unit 204 for which the principles of the present invention may be practiced without departing from the scope of the invention.

6. L1 Cache

Figure 6:
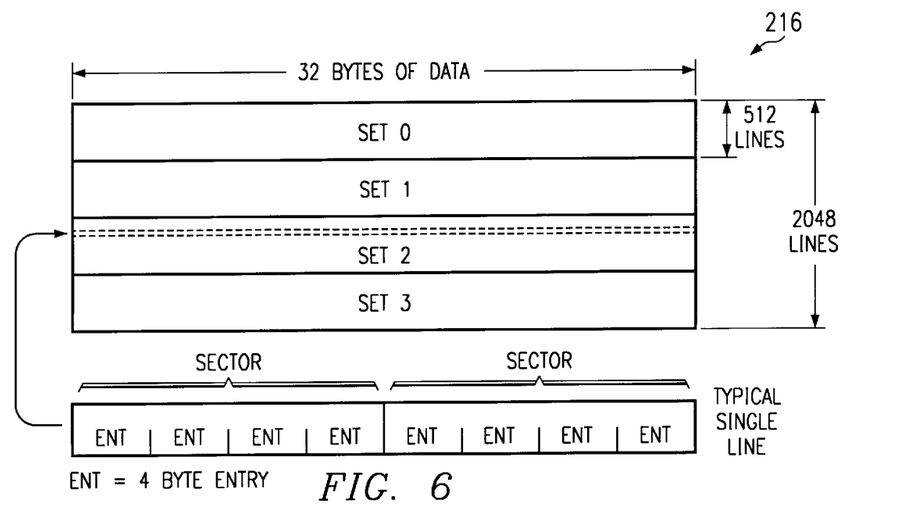
FIG. 6 is a simplified block diagram of the preferred L1 cache portion of the Cache Unit depicted in FIG. 5.

Reference is now made to FIG. 6 which depicts more detail of the L1 cache 216. The L1 cache 216 is preferably divided into four 16K byte sets. Each 16K byte set contains 512 lines. Each line is thirty-two bytes in size and is preferably divided into two 16-byte sectors, each sector described by its own modified MESI bits, described in more detail hereinbelow. When a cache line is allocated, bits A31–A14 of the main memory address are stored in the cache tag 224 (FIG. 5) with address bits A13–A5 identifying the 32-byte cache line and address bits A4–A2 identifying the specific 4-byte entry within the cache line. The L1 cache 216 is preferably although not exclusively banked and interleaved accessible to allow any two of the following operations to occur in parallel: code fetch, data read (X pipe, Y pipe or FPU) and data write (X pipe, Y pipe or FPU). Cache architectures are ubiquitous and well known in the art. For completeness, however, the book *Computer Architecture A Quantitative Approach*, Section 8.3 pages 408–424, by David A, Patterson and John L. Hennessy, Morgan Kaufmann Publishers, Inc., 1990, a cache architecture primer, is herein incorporated by reference.

7. Replacement/Lock-Down Technique

Figure 7:
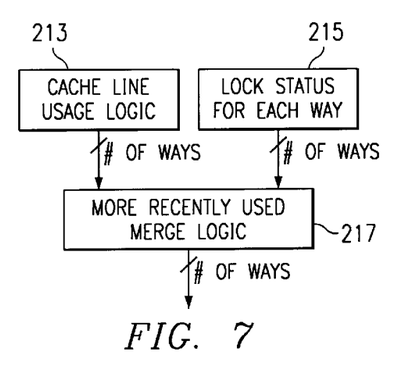
FIG. 7 is a block diagram of modified cache line replacement logic in accordance with the principles of the present invention.

Reference is now made to FIG. 7 which depicts a block diagram of modified cache line replacement logic in accordance with the principles of the present invention. Cache line usage logic 213 may be any conventional LRU/MRU technique/circuitry and lock status indicator 215 may be any conventional circuitry that indicates whether cache lines, line, or portion thereof are locked. In the preferred embodiment however, the lock status indicator 215 is encoded into the MESI protocol cache coherency state bits which are stored in the cache tag 224 (FIG. 5). Those skilled in the art will bring to mind with the aid of the present disclosure, other systems and methods for indicating cache line usage and lock status without departing from the scope of the present invention.

As described in more detail hereinbelow, the "more recently used" merge logic 217 inhibits replacement of the contents for any cache line way indicated as being the oldest but also marked as being locked. Rather, the "more recently used" merge logic 217 replaces the cache line contents residing in the next oldest set that is not indicated as being locked. If multiple sets are indicated as being of the same "age", then Way0 is replaced before Way1 which is replaced before Way2 which is replaced before Way3. Those skilled in the art will bring to mind with the aid of the present disclosure, other orders for "tie-breakers" without departing from the scope of the present invention.

Figure 8:
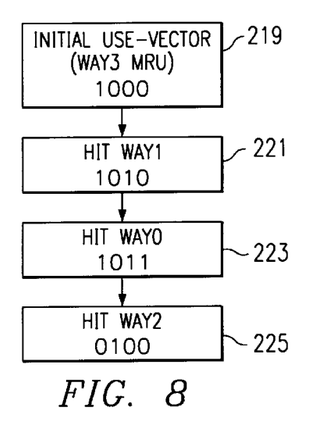
FIG. 8 is a flow diagram of the modified cache line replacement technique.

Reference is now made to FIG. 8 which depicts a flow diagram of the "more recently used" replacement logic for each cache line/sector in the four Way set associative L1 cache 216. Each of the four Ways has a bit associated with it indicating that it has been "more" recently used if set (e.g. "1") and "less" recently used if clear (e.g. "0"). Collectively, the four bits form a "Use-Vector". The Use-Vector however, should never be all ones (i.e. "1111") because to do so would not give any indication as to what Way to replace. As described below, if the Use-Vector is about to roll over to all ones ("1111"), then all usage bits except for the use bit the caused the roll over are cleared (i.e. indicate less recently used).

At step 219, the Use-Vector is depicted as being cleared except for Way3. At step 221, a hit occurs at Way1 and the Use-Vector becomes 1010. At step 223, a hit occurs at Way0 and the Use-Vector becomes 1011. At step 225, a hit occurs at Way2 and the Use-Vector becomes 0100 instead of 1111. This of course assumes that none of the four Ways are locked. If for example, Way3 was locked at step 223, then the resulting Use-Vector at step 225 would be 1100 instead of 0100.

In the preferred embodiment, the "more" recently used cache line replacement technique can be configured to allocate new lines on read misses only or on read and write misses. Each sector of each cache line is assigned one of six states namely: Unlocked Modified, Unlocked Exclusive, Unlocked Shared, Unlocked-Invalid, Locked-Valid and Locked-Invalid, as defined by V, MESI state bits stored in the cache tag 224 (FIG. 5). The preferable, although not exclusive approach to programming the modified MESI state bits in the cache tag 224 is through test registers TR3–TR5 existing as part of the system register set described herein above. While the preferred embodiment contemplates assigning a lock status indicator (e.g. V, MESI state bits) for each cache line sector, those skilled in the art will recognize other sizes (e.g. line or multiple lines) for which the lock status indicator may apply and other means for indicating lock status (other than V, MESI), without departing from the scope of the invention.

Cache lines, line, or portions thereof (in the preferred embodiment, "sectors") that have a "Modified" state reflect those that have been updated by the processor 200 but the corresponding location in system memory 402 (FIG. 1) has not yet been updated by an external write cycle. Modified cache lines/sectors are sometimes referred to as "dirty". Cache lines or portions thereof that have an "Exclusive" state reflect those exclusive to processor 200 and are not duplicated into a cache of another caching agent such as an L1 cache of a second processor in a multiprocessor system (not shown). A write to an exclusive line/sector may be performed without issuing an external write cycle. Cache lines or portions thereof reflect those having a "Shared" state that may be present in the cache of another caching agent within the same system. A write to a shared cache line/sector forces a corresponding external write cycle. Cache lines or portions thereof that have an "Invalid" state do not contain any valid data.

Figure 9:
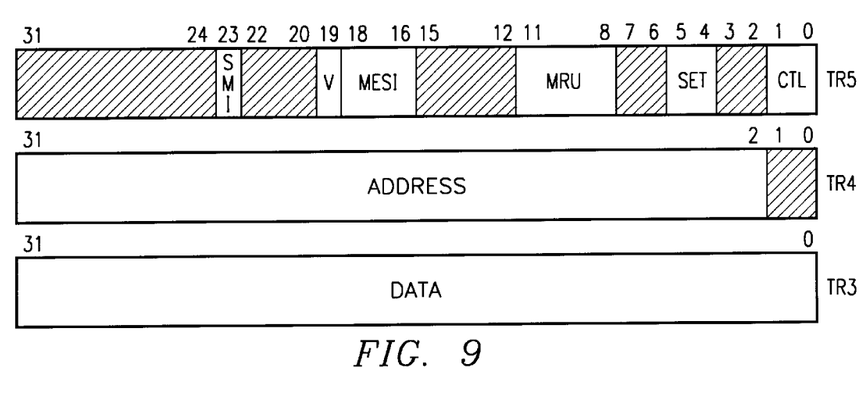
FIG. 9 is a block diagram of registers associated with configuring the L1 cache depicted in FIG. 6; and, FIG. 10 depicts an alternative technique for programming locked down regions within the L1 cache.

Reference is now made to FIG. 9 which depicts the relevant test registers TR3, TR4, and TR5 within the system register set of the preferred embodiment for programming/testing the L1 cache 216. It is to be understood that those skilled in the art will bring to mind with the aid of the present disclosure, other means for programming the locked down regions within the L1 cache 216 (such as, but not limited to, MSRs described hereinbelow), without departing from the scope or spirit of the present invention.

For cache writes, test registers TR3 and TR4 are initialized before writing to test register TR5. Eight 4-byte accesses are performed to access a complete cache line. During a cache write, 32-bits of data are written to test register TR3 and tag field information is written to the physical address selected by the ADDRESS field residing in test register TR4 and the SET field in TR5. During a cache read, the physical address resides in the ADDRESS field of test register TR4 and the SET field of test register TR5. The TVB, MESI and MRU fields of test register TR5 are updated with the information from the selected cache line. Test register TR3 returns the selected read data.

A cache flush occurs during a write to test register TR5 if the CTL field is set to zero. During a cache flush, all lines in the L1 cache 216 are read and those with MESI bits indicating "modified" are redefined as "shared". Table 6 below tabularizes the preferred field definitions of test registers TR3, TR4, and TR5.

processor 200 and may be incoherent with other memory in the system. Regions within the L1 cache 216 are locked by setting the V, MESI state bits (19-16) of a sector(s) within cache line(s) to "locked-Valid." or "locked-Invalid". Locked regions of the L1 cache 216 are cleared on power-on-reset but are preferably unaffected by a warm reset, assertion of the FLUSH# signal, or execution of the INVD and WBINVD instructions—none of which are described in detail but all of which are within the ordinary skill of the art—particularly with reference to the *Cyrix 6x86Processor Data Book*, Order Number 94175-01, dated March 1996, which was herein incorporated by reference.

The L1 cache 216 is preferably flushed before physical addresses are locked down. At least one set within the L1 cache 216 preferably remains unlocked for standard caching operations. Physical addresses to be locked down are first checked against previously locked addresses to avoid alias-

TABLE 6

Field Definitions of TR3, TR4, and TR5

| REGISTER NAME | FIELD NAME | RANGE | DESCRIPTION |
|---|---|---|---|
| TR5 | SMI | 23 | SMIAddressBit Selects separate/cacheable SMI code/data space |
|  | V, MESI | 19–16 | Valid,MESIBits<br>If = 1000, Modified<br>If = 1001, Shared<br>If = 1010, Exclusive<br>If = 0011, Invalid<br>If = 1100, Locked-Valid<br>If = 0111, Locked-Invalid<br>Else = Undefined |
|  | MRU | 11–8 | Used to determine the MoreRecently Used set |
|  | SET | 5–4 | Cache Set Selects one of four cache sets to perform operation on. |
|  | CTL | 1–0 | Controlfield<br>If = 00: flush cache without invalidate<br>If = 01: write cache<br>If = 10: read cache<br>If = 11: no cache or test register modification |
| TR4 | ADDRESS | 31–2 | PhysicalAddress |
| TR3 | DATA | 31–0 | Data written or read during a cache test |

The L1 cache 216 can "lock down" regions on a sector by sector basis. These programmable regions are local to the ing (creating synonyms). Table 7 below tabularizes the cache locking operations.

TABLE 7

Cache Locking Operations

| Read/Write | ECX | EDX | EAX | Operation |
|---|---|---|---|---|
| Read/Write | 03h | — | Data to be read or written from/to the cache | Loads or stores data to/from TR3. |
| Write | 04h | — | 32 bits of address | Address in EAX is loaded into TR4 to identify which cache line to be locked down. |
| Read | 04h | — | 32 bits of address | Stores the contents of TR4 in EAX |
| Write | 05h | — | Data to be written into TR5 | Performs operation specified in CTL field of TR5. |
| Read | 05h | — | Data in TR5 register | Reads data in TR5 and stores in EAX |

8. Alternative Approach For Programming Locked-Down Regions

Figure 10:
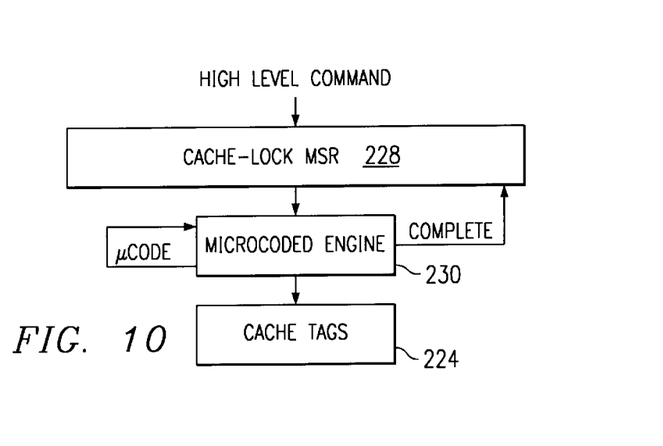

Reference is now made to FIG. 10 which depicts an alternative technique for programming locked down regions within the L1 cache 216. High level "sophisticated" commands are passed through a so-called "cache-lock" model specific register (MSR) 228. It is to be understood that that cache-lock MSR 228 may be a plurality of registers without departing from the scope of the present invention. The high level command need not reference physical addresses to lock down regions within the L1 cache 216. Rather, the high level command may pass parameters through the cache-lock MSR 228 indicating its needs (e.g. it needs a 5k byte block of RAM) to drive a microcoded engine 230. The microcoded engine 230 then sets the state bits in the cache tag 224 to Locked-Valid for a 5K byte block of memory within the L1 cache 216. A status bit is sent back by the microcoded engine 230 to indicate completion. The status bit may take the form of an exception, an interrupt, or as a settable bit in the cache-lock MSR 228. The use of high level "sophisticated" commands and the "cache-lock" MSR 228 relieves the programmer of setting individual lock status/valid bits (e.g. MESI state bits) for each line/sector. Exemplary high level commands for the cache-lock MSR 228 may include, but are not limited to:

TSTLOCKABILITY—test if the region sought to be locked down in the L1 cache 216 is in fact, lockable. For example, the region sought to be locked-down may exceed the available space in the L1 cache 216.

LOCKFILL—Fill a specified locked-down region in the L1 cache 216 with all zeros, ones, or with existing data in the L1 cache 216 without first making it coherent with system memory 402.

LCOHERENT—Make a specified locked-down region in the L1 cache 216 coherent with system memory 402 before locking.

UNLOCK—Unlock specified regions in the L1 cache 216.
LOCKINV—Lock-down but invalidate specified locked-down regions in the L1 cache 216.

With the aid of the present disclosure, those skilled in the art will bring to mind many specific implementations for the microcoded engine 230 and other means and methods for programming/locking regions for cache line/sectors on a finely granular basis without departing from the scope of the present invention.

9. Superscalar Conflict Resolution

In the case of a superscalar architecture (e.g. X and Y pipes), the present invention contemplates a "de-pipelined" cache bus to avoid replacement-lock conflicts between pipes.

10. Exemplary Applications

10.1 Masking Defective Cells In The Cache

A practical application for locking finely granular regions of the L1 cache 216 is avoidance of having to scrap an expensive die. This application is most salient in an unitary die that includes the processor Core 202, Cache Unit 204, MMU 206, and the BIU 208. Before the present invention, the entire die was scraped if even only one out of thousands of bytes in the L1 cache 216 was defective. In accordance with the present invention, a diagnostic program (which may be part of BIOS or the operating system) is run on power up of the processor 200 to check the integrity of the L1 cache 216. The diagnostic program sets the MESI protocol as Locked-Invalid for each sector (16 bytes in the preferred embodiment) in which the defective bit or byte resides. Accordingly, the die is usable except that the L1 cache 216 shrinks in size by the sector size (worst case) for each defective byte. The shrinkage of the L1 cache 216 is less however, if multiple defective bytes reside within a single sector.

10.2 SMI Applications

The preferred embodiment supports a system management interrupt (SMI) which invokes a supervisory system management mode (SMM). An exemplary, although not exclusive SMM is disclosed in pending U.S. patent application Ser. No. 08/388,127, filed Mar. 9, 1995, entitled "Enhanced System Management Method And Apparatus With Added Functionality", which is a file-wrapper-continuation of U.S. patent application Ser. No. 08/062,014, which is a continuation-in-part application of U.S. patent application Ser. No. 07/900,052, filed Jun. 17, 1992, all assigned to the Assignee of the present invention, and all herein incorporated by reference.

The so-called SMM "header" is a "stack-like" area in memory which holds the state of the processor 200 before entrance into SMM. If the SMM header resides in system memory 402, many clock cycles are expended thus a long latency is induced, when SMM is invoked. Accordingly, the present invention locks down (dedicates) cache line sectors in the L1 cache 216 to hold the SMM header thus speeding up entry and exit to SMM.

Moreover until now, program code written for debugging purposes for execution under SMM was not cached due to the potential that it would evict data from the program being debugged and thus impact the debug purpose. SMM code can now be stored in the L1 cache 216 and locked-down to avoid such a problem.

10.3. Critical-Loop Program Storage

Time-critical program loops such as an SMM handler (i.e. the section of the SMM program that resolves the source of the SMI and vectors off to the correct routine) and inner loops of an emulation program (particularly real-time devices such as video/audio compression, modems and audio) are preferably stored in a locked regions in the L1 cache 216 in accordance with the present invention. In this manner, the processor 200 can execute critical loop programs in a zero-wait state fashion.

10.4. Critical Data Storage

The locked down area of the L1 cache 216 can extend the register set of the processor 200 without inducing wait states.

10.5 Micro-Architecture Extension

The locked-down regions of the L1 cache 216 can be used to store additional or "patched" code that would extend/repair the instruction set of the processor 200. The code may manifest itself as micro-code, RISC (pseudo) op-codes (ROPS), native machine op-codes, or data and would be accessible through an internal trap mechanism such as, but not limited to, a fast entry/exit SMI.

11. Conclusion

Although the Detailed Description of the invention has been directed to certain exemplary embodiments, various modifications of these embodiments, as well as alternative embodiments, including extensions to other levels of cache (e.g. L2 cache) will be suggested to those skilled in the art. The invention encompasses any modifications or alternative embodiments that fall within the scope of the Claims.

What is claimed is:

1. A cache with finely granular, programmable, locked-down regions comprising:
   (a) a set associative array, each set having a plurality of lines, each line having at least one tag; and,
   (b) the at least one tag having a field capable of indicating that at least a portion of the line is locked-down to prevent eviction and validity of each line or portion thereof.

2. The cache as recited in claim 1 wherein the field that indicates whether each line or portion thereof is locked-down is represented as a modified MESI state.

3. The cache as recited in claim 1 wherein the field that indicates whether each line or portion thereof is locked-down is programmed through at least one test register.

4. The cache as recited in claim 1 wherein each line is partitioned into at least two sectors.

5. The cache as recited in claim 1 wherein the finely granular, programmable, locked-down regions are set with high level commands through accesses to at least one model specific register.

6. The cache as recited in claim 1 wherein the field in the at least one tag indicates locked and invalid for each line or portion thereof that is defective.

7. A method for programmably locking-down finely granular regions in a cache comprising the steps of:
(a) caching data in a set associative array, each set having a plurality of lines, each line having at least one tag; and,
(b) programming a field in the at least one tag to indicate that at least a portion of the line is locked-down to prevent eviction and indicating validity of each line or portion thereof.

8. The method as recited in claim 7 wherein step (b) comprises writing a modified MESI state.

9. The method as recited in claim 7 wherein step (b) comprises programming the field through at least one test register.

10. The method as recited in claim 7 wherein step (b) comprises issuing high level commands to at least one model specific register.

11. The method as recited in claim 7 further comprising a step of indicating locked and invalid for each line or portion thereof that is defective.

12. In a computer having a motherboard, a processor having an internal cache, and system memory external to the processor, a method for programmably locking-down finely granular regions in the cache comprising the steps of:
(a) retrieving instructions from system memory;
(b) executing the instructions with the processor;
(c) caching instructions and data in the cache, the cache being a set associative array with each set having a plurality of lines and each line having at least one tag; and,
(d) responsive to predetermined instructions, programming a field in the at least one tag indicating that at least a portion of the line is locked-down to prevent eviction and indicating validity of each line or portion thereof.

13. The method as recited in claim 12 wherein step (d) comprises writing a modified MESI state.

14. The method as recited in claim 12 wherein step (d) comprises programming the field through at least one test register.

15. The method as recited in claim 12 wherein step (d) comprises issuing high level commands to at least one model specific register.

* * * * *